Oct. 11, 1966 L. R. MANGRUM 3,278,662
PROCESS FOR MAKING TILE EMBODYING STONE PARTICLES
Filed Nov. 17, 1965 2 Sheets-Sheet 1
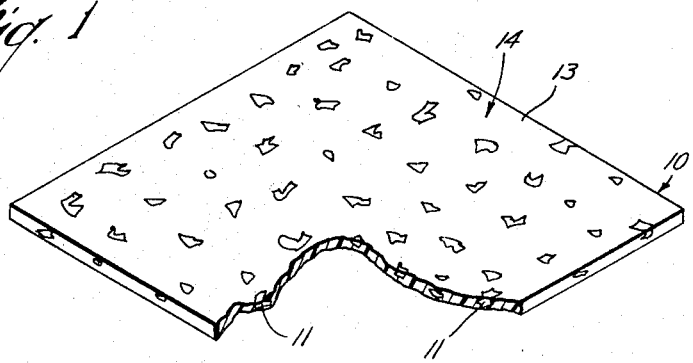
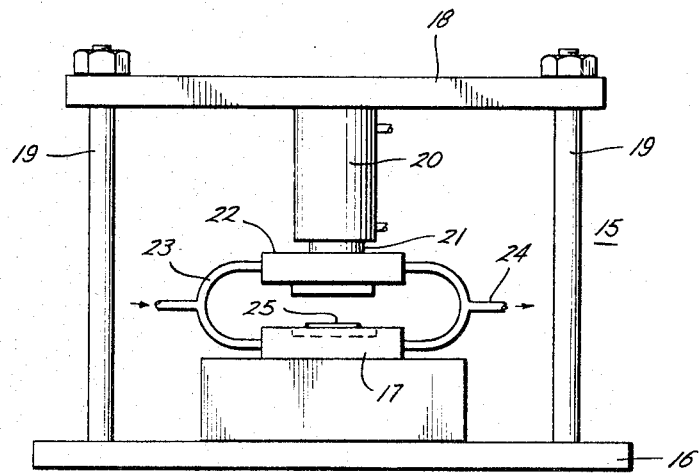
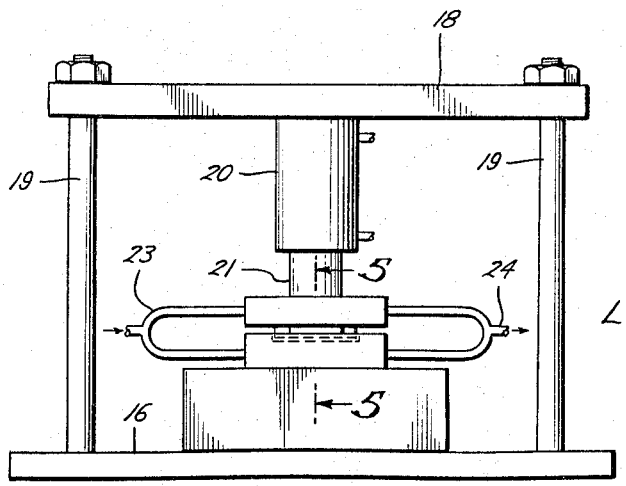
Lee R. Mangrum
INVENTOR.
BY Browning, Simms,
Hyer & Eickenroht
ATTORNEYS Oct. 11, 1966 L. R. MANGRUM 3,278,662
PROCESS FOR MAKING TILE EMBODYING STONE PARTICLES
Filed Nov. 17, 1965 2 Sheets-Sheet 2

Lee R. Mangrum
INVENTOR.

BY Browning, Simms,
Hyerl Eickenroht
ATTORNEYS 3,278,662
PROCESS FOR MAKING TILE EMBODYING STONE PARTICLES
Lee R. Mangrum, 1204 S. Johnson St., Pasadena, Tex.
Filed Nov. 17, 1965, Ser. No. 514,743
8 Claims. (Cl. 264—77)

This application is a continuation-in-part of my copending application Serial No. 109,722, filed May 15, 1961, now abandoned, for a process for making tile embodying stone particles.

This invention relates to tiles having a plastic matrix embodying stone particles, and to a method for manufacturing such tile.

Stone sheathing such as marble is highly decorative as a building material but its relatively high cost compared to other types of surface facings prevents extensive use in applications where cost is a controlling factor. Similarly, terrazzo, which is a surface facing made of stone particles set in a matrix of cement and then polished, is limited in use because of its high cost as compared to the cost of other floor and wall facing materials. The principal expense in a terrazzo facing is due to the labor required to apply it. Generally terrazzo facings must be applied in situ and such application is very inconvenient because of the delay encountered in waiting for the cement matrix to harden.

Stone particles have been added to floor and wall tiles comprising a matrix of vinyl or rubber plastic compositions but have not produced a satisfactory terrazzo tile because the vinyl or rubber composition matrix is much softer than the stone particles embedded therein and does not securely hold stone chips of terrazzo size in place. Attempts have been made to incorporate stone particles in thermosetting resins which on curing produce a much harder matrix. The use of a mixture of stone particles in a matrix of thermosetting resin, however, has created manufacturing problems of such magnitude that the production of commercially acceptable tile having the appearance of stone sheeting or terrazzo by simple compression molding has not been achieved before the present invention.

In the past, one of the principal problems encountered in attempting to form tile from thermosetting resins containing stone particles by compression molding, that is, by placing a selected amount of the uncured mixture in a lump in a heated mold disposed in a press, and closing the press upon the mold to form tile, has been the tendency of the thermosetting resin to flow outward from the stone particles as the mold closes upon the mixture. Although the mixture is thick and has the appearance of a wet dough when it is first placed in the heated press and pressure is applied, a thermosetting resin mixture containing a polymer and a monomer becomes quite fluid and does not carry the stone particles uniformly outward as the lump of mixture spreads in response to pressure from the mold. This uneven flow of resin and stone particles is particularly noticeable when the stone particles are above 100 mesh in size. As a result the stone particles tend to be left in a pile in a central location in the mold so that they are bunched or clustered together, and as the mold closes, the particles are crushed. Crushing the particles forms new surfaces not properly wetted with the resin, with the end result that the cured tile is of such poor quality that it is commercially unacceptable. The non-uniform flow of the stone particles is more pronounced the larger the particles.

Even in the compression molding to form a tile having a marble-like appearance in which only small stone particles, as for example 100–200 mesh size are incorporated in a matrix of thermosetting resin, the problem of non-uniform flow of the stone particles occurs. In making simulated marble tile by molding thermosetting plastic containing stone particles under pressure in which conventional coloring matters such as pigments, which may in themselves be fine stone particles, are incorporated in the mixture, the pigments are retained with the bunched stone particles, so that the desired streaked or mottled appearance has not been obtainable.

Attempts have been made to overcome the failure of stone particles to flow evenly during molding, so that they become evenly distributed in a matrix of thermoset resin when the tile is cured by compression molding, by increasing the resin content of the mixture. The net result of this procedure was merely to increase the cost of the tile without reducing appreciably the number of defective tile formed, since the resin is the more expensive part of the tile.

Hand troweling or other means for mechanically spreading thermosetting resin-stone parictle mixtures in the mold prior to application of pressure have been necessary when tiles have been made from mixtures of thermosetting plastics and stone particles. These procedures increase cost of the tile by increasing the molding cycle time and labor costs or equipment costs.

Another problem that has been encountered in trying to make square or rectangular tile from the thermosetting resins and stone particles has been due to shrinkage of the tile during cure. Such tiles frequently shrink so much during curing that they have a pronounced concave curvature of edges between adjacent corners of the tile. This defect can be overcome by making the tile larger than is required and then grinding the edges to conform to the square or rectangular shape desired. This operation however is so expensive that tiles made in this manner cannot be sold at a price competitive with other materials.

Additional problems have been encountered in attempts to produce tiles comprising stone particles embedded in a matrix of thermoset plastic resin in that failure of the stone particles to flow evenly in the mold frequently results in the entrapment of air in the mixture, creating undesirable voids in the resulting tile.

It has now been found that the problems of correcting excessive shrinkage of the tile, bunching or clustering of stone particles in the mold as the mixture flows outward under pressure, and air pockets in the tile are easily corrected by the use of much smaller ratios of resin (including polymer and monomer) to stone particles than have been used in the past together with stone particles in different size ranges. It has been found that the attempts to secure better distribution of stone particles in the tile by increasing the proportion of resin have been directly opposite to procedures effective to secure this result. Use of formulae in which the proportion of resin in excess of 25% by weight inherently results in failure of the stone particles to flow evenly with the resin.

It has been found that a mixture of a thermosetting resin containing about 7 to 25 weight percent of resin or preferably about 10 to 12 weight percent and about 93 to 75 weight percent of stone particles or preferably about 90 to 88 weight percent does not shrink substantially during curing so that edges of tile produced by compression molding are substantially straight. Furthermore, when the mixture includes total stone particles in the proportions stated above, stone particles of size to flow unevenly with the resin on application of pressure, i.e., above 100 mesh size, flow substantially evenly in the mold when a sufficient proportion of finer stone particles is included in the mixture to cause the larger particles to flow with the smaller ones.

Production of defective tiles due to air pockets enclosed in bunched stone particles occurs very rarely. This is true whether or not the tile contains chips of terrazzo size, that is of size to be retained upon a screen having openings in the size range from about 1/16 inch up to about 1/32 inch less than the thickness of the tile to be produced.

Excellent tile having a marbleized appearance, even distribution of stone particles and distribution of pigments to give a mottled, streaked or variegated appearance to the tile, have been produced both when particles in the mixture were of 100 mesh size, or silica or marble crushed to pass a 40 mesh screen without further sizing were used, when clay particles of 10 to 1 micron size were included in the mixture in quantity to cause uniform flow of the larger particles.

Even flow of chips of terrazzo size has been obtained with uniform distribution of chips throughout the tile when sufficient filler is present so that the percentages of resin and stone particles are as stated above. The quantity of chips used to produce terrazzo tile may be small enough that the chips are distributed at substantially any desired distance from each other, provided that the smaller stone particles making up the filler in the tile are present in such quantity that the chips flow uniformly. The resin preferably is present in amount somewhat in excess of that required to wet all surfaces of the stone particles and to fill residual interstices between the particles.

It is preferred that the stone particles be present in a series of size ranges so that particles in each smaller size range are present in quantity roughly approximately that required to substantially fill voids between larger particles when the larger particles are disposed in such volumes as to be substantially in contact with each other, thus leaving a relatively small volume of residual voids to be filled by the resin. This arrangement of larger particles having voids between them filled with smaller particles of decreasing sizes is similar to the use of coarse aggregate, fine aggregate and sand, with residual voids between the sand and aggregate filled with Portland cement, as is common in the preparation of concrete.

Although the stone particles are irregular in shape and vary in size within any selected size range the voids between particles may be estimated roughly as about 30 to 45% of the volume occupied by the particles in one size range. Thus one preferred formula is:

| | Wt. percent |
|---|---|
| Large aggregate 1/16–1/4" (approx.) | 50 |
| Medium aggregate 30–80 mesh (approx.) | 24 |
| Small aggregate 100–200 mesh (approx.) | 8 |
| Clay about 10–1 micron (approx.) | 8 |
| Resin, balance. | |

The large aggregate (chips) above preferably is quartz, granite, marble, Carborundum, etc. The medium aggregate preferably is a mixture of silica and marble. When a tile having an appearance of marble is desired and the chips blend into the marble pattern rather than contrast with a background matrix as in a terrazzo tile, it is preferred that the large aggregate (chips) be of silica, the medium aggregate be a mixture of silica and crushed marble, the fine aggregate be barium sulfate, and the clay be a white non-hydratable clay such as kaolin, etc.

If a streaked or mottled appearance be desired, a very small quantity of a pigment of desired color is added after the resin-stone particle mixture has been thoroughly mixed and the pigment is imperfectly blended with the mixture.

The largest size of particles used need not be of the chip size given above. For example, if the largest stone particles are of any size large enough for the particles to flow unevenly with a thermosetting resin under heat and pressure, i.e., above 100 mesh size, even distribution of particles in the matrix may be obtained by including finer stone particles in proportions approximating those given above. The series of size ranges given in the above formula then merely has a lesser number of members and the smaller sizes are used in proportions to each other approximating those shown above although the weight percent in the total mixture is of course larger.

It will be seen that the proportions of resin to larger and finer stone particles is dependent to some extent upon the total surface area of the stone particles and on the average size of residual voids as well as the quantity of stone particles. Although these properties are very difficult to determine accurately, it has been found that rough approximation is all that is required to make excellent tile, and that these rough approximations can be made easily from weight or volume relationships as set forth below.

The term "stone" is used in this specification and claims in the sense defined by Webster's Collegiate Dictionary published by G. & C. Merrian Company of New York, 1961, page 835 "stone ... one (b) rock or rockline matter as a material" and to include not only naturally occurring materials such as quartz, granite, marble, non-absorbent clays, etc., but also synthetic stones, as for example, aluminum oxide, barium sulphate, calcium carbonate, "Carborundum," "Norbide," pigments such as titanium oxide, iron oxide, etc.

The term "filler" is applied to stone particles having sizes in the range from about 1 micron up to a maximum size that will pass through a standard 30 mesh screen. The term "chips" is applied to stone particles having sizes in the range from about 1/16 inch to maximum size that will pass through a screen having openings about 1/32 inch less in diameter than the thickness of the title to be made.

It is an object of the present invention to provide a tile in which stone particles are substantially evenly distributed throughout the tile, each of said particles being encapsulated in a thermoset resin, said resin being in small amount relative to the stone particles.

Another object is to provide a tile having stone particles embedded within the matrix of thermoset resin wherein the stone particles are so close together that differential wearing about the stone particles is substantially eliminated.

Another object is to provide a process for making a tile in which stone particles are substantially evenly distributed in a substantially minimum amount of thermoset resin matrix.

Another object is to provide a process for making stone particles in a matrix of thermoset resin wherein the sizes and proportions of stone particles and proportions of resin are such that substantially uniform distribution of the stone particles in the matrix may be obtained merely by pressure upon the uncured composition.

Another object is to provide a process for manufacturing tile containing stone particles in a matrix of thermoset plastic which provides substantially uniform distribution of the stone particles by heat and pressure.

Still another object is to provide a process for making tile containing stone particles substantially evenly distributed in a matrix of thermoset plastic in such proportions that the tile does not shrink appreciably during molding.

Another object is to provide a process for making a tile containing stone particles substantially evenly distributed in a matrix of thermoset plastic containing less plastic than has been necessary heretofore.

Still another object is to provide a process for making tile containing stone particles substantially evenly distributed in a matrix of thermoset plastic wherein the stone particles are in such proportion as to conduct heat rapidly through the mixture and result in a quick cure.

Other objects and advantages will become apparent to those skilled in the art from the following description, examples and consideration of the drawings submitted herewith.

FIG. 1 is a perspective view of a plastic tile made in accordance with the present invention and with a portion broken away to show the interior composition that produces a terrazzo-like appearance in the tile.

FIG. 2 is an elevation illustrating a molding apparatus suitable for molding tiles in accordance with the present invention.

FIG. 3 is an enlarged partial elevation of the dies of the molding apparatus of FIG. 2 in a closed position.

Figure 4:
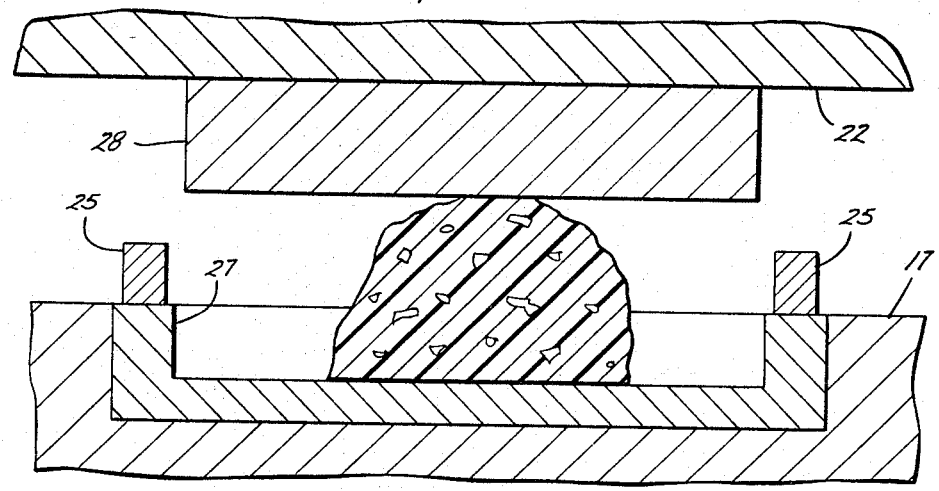
FIG. 4 is an enlarged partial section of the dies in the molding apparatus of FIG. 2 in a partially closed position and with a mass of tile-forming mixture uniformly flowing between such dies.

The thermosetting resins employed in the process and tile of the present invention may be any of the well-known thermosetting type such as for example, polyester resins, melamine resins, phenolic resins, epoxy resins, etc. In molding and curing objects made from resins, of this type, it is customary to make a resin mixture including a polymer and a monomer capable of reacting with the polymer to form a thermoset plastic material.

The monomers are organic compounds capable of reacting by polymerization through unsaturated double bonds and generally are low viscosity liquids at room temperature, whereas the polymers with which they are mixed are thick, viscous liquids to pasty materials. Mixture of the monomer and polymer results in thinning the polymer so that the mixture can be incorporated into a mass of stone particles by suitable mixing devices. It is common practice to use anywhere from about 20 to 50% of a suitable monomer with a polymer of a type given above to make a thermosetting plastic mixture to make a composition suitable for molding and curing into a thermoset plastic. It is also customary to include in the mixture a catalyst and a mold release agent. The catalyst is ordinarily used in the percentage amount of about ½ to 2% of the weight of the polymer and the mold release agent in the range from about ½ to 1%. Monomers often used with polymers of the above types include styrene, vinyl toluene, divinyl benzene, methyl methacrylate, diallyl phthalate, methyl styrene, and others. The polymers and monomers used are selected according to their known ability to produce thermoset plastics having general characteristics, such as alkali or acid resistance, hardness, etc. which may be desirable in a tile to be produced. Selection of the thermosetting resin for such properties forms no part of the present invention, in which any desired thermosetting resin may be used.

The polyester resins often will be preferred because of the short curing time required with these materials when the known properties of a polyester plastic are suitable for the use for which the tile is made. For example, tile containing stone particles in the range from 75 to 93 weight percent in a matrix of polyester resin often may be cured in a curing cycle time of about 15 seconds, including placing a lump of resin-stone mixture in a preheated mold, closing the mold under pressure thereby forming a tile, effecting preliminary cure of the tile, and withdrawing the tile from the mold. Post-cure is easily obtained by stacking withdrawn tiles upon each other for slow cooling in the ambient atmosphere.

In the present invention the stone particles are almost in contact with each other when minimum quantities of resin are used, although encapsulated with a thin layer of thermoset plastic which also fills residual voids in the tile. Since it is frequently desirable to use stone particles of various types in the different size ranges, and the bulk density will vary according to size and type of stone proportions by weight give only rather rough approximations of the proportions required to secure the desired results when changes are made from one type of stone to another. However only rough approximation is necessary.

In using a new mixture in which stone of sizes and composition different from those shown in the examples given below are used, proportions of resin to stone particles by volume may be useful in determining quantities of resin required for optimum desired properties in a tile made from any desired thermosetting resin and stone particles. In approximating the amount of resin required, the proportions of resin given by weight in the following examples may be doubled to secure a very close approximation of proportions by volume. For example, where a composition containing a resin (polymer and monomer) content is shown in Example I below, in which the resin content is 7.2 weight percent, the resin content is 14.58% by volume so that the stone particles are present in proportions of 92.7% or 85.4% by weight or volume, respectively. The proportion of catalyst and mold release agent are so small that they may be neglected in such calculations.

Since the bulk density of any type and size of stone particles is easily determined merely by weighing a known volume of this material, and the specific gravity of the resin is easily determined, it is very easy to convert proportions by weight to proportions by volume, or inversely, from volume to weight. Since surface area of the stone particles affects the quantity of resin required to encapsulate all stone particles, and size and general shape of the particles affects the volume of voids between the particles, these factors should be taken into account in preparing tile formulae not specifically recited in the examples. For example, if greater proportions of finer particles, or larger particles of relatively porous nature are used, thus providing increased surface area the proportion of resin should be increased by a small amount, usually not more than 2% or so from the minimum shown in the examples, and if the voids between particles are larger or smaller, the proportion of resin should be increased or decreased accordingly. In any event, the proportions of resin should be between the minimum and maximum proportions shown.

There is shown in FIG. 1 a plastic tile 10 embodying stone particles which has a terrazzo appearance. The tile 10 embodies chips 11 of size as described above which are held in a matrix 13 of resin and filler. The tile 11 has one exterior surface 14 ground to expose to a greater extent the surface of chips 11.

Before describing the process of manufacturing the tiles of the present invention, a molding apparatus suitable for performing the process steps will be described. Referring more particularly to the drawings, there is shown in FIG. 2 a molding apparatus 15 which includes a base 16 on which is supported a lower die 17. A horizontal cross member 18 is rigidly spaced from base 16 on supports 19. Vertically mounted on cross member 18 is fluid actuated cylinder 20 containing a piston 21. Piston 21 is reciprocated by means of fluid pressure applied to cylinder 20. An upper die 22 is carried on the lower extremity of piston 21. The dies 17 and 22 are adapted to be heated by steam applied through conduits 23 to passageways (not shown) which extend through the dies. Exhaust steam is removed from the dies through conduit 24. Other means of heating the dies 17 and 22 can be utilized if desired.

Referring to FIG. 3, the dies 17 and 22 are arranged so that when they are in their ultimate closed position adjacent one another a cavity is formed between them which, in the illustrated embodiment of the present invention is adapted to be filled with a tile-forming mixture to produce a tile 10 as shown in FIG. 1. A gauge block 25 is carried upon the upper surface of lower die 17 and determines the vertical spacing in the form defining the cavity between the dies and, in turn, determines the thickness of the tile 10. A small clearance 26 between the meeting vertical edges 27 and 28, respectively, of the dies 17 and 22 is necessary in order that the dies may be moved easily between open to close positions.

Figure 5:
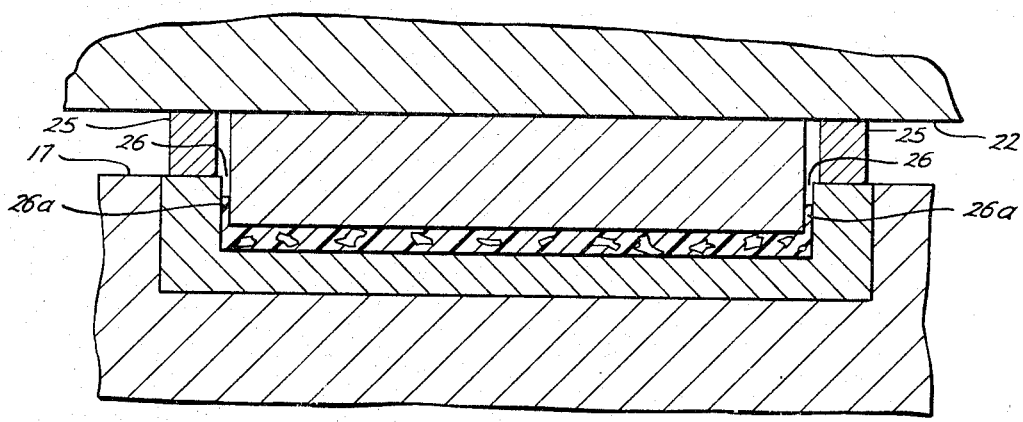
FIG. 5 is an enlarged partial section along line 5—5 of FIG. 3 with the dies of the molding apparatus in their ultimate cavity-forming position and with the tile-forming mixture completely filling the cavity and flashing between the meeting edges of the dies.

The tiles of the present invention are manufactured by a process which includes the steps of intimately mixing the ingredients of the tile-forming mixture so that a homogeneous mixture results, and placing a mass of such mixture in an amount in slight excess of that required to form the tile 10, between the preheated dies 17 and 22 while in open position. The dies 17 and 22 are then closed under pressure with continued heating to uniformly distribute the tile-forming mixture between the dies and to cause some of the mixture to flash between the meeting edges 27 and 28 to fill the clearance 26 so that the mixture is enclosed as seen most clearly in FIG. 5. Because of the nature of the tile-forming mixture, the mixture 26a flashed between the meeting edges of the dies forms an effective circumferential seal therebetween so that upon further closing of the dies to their ultimate cavity-forming position, the mixture is compressed while it is heated. Pressure is applied to effect such compression and should be a pressure at least sufficient to cause solution of the fluids, including entrapped air, into said mixture and the temperature should be within the setting temperature range of the resin. The pressure and temperature are maintained until the thermosetting resin hardens to form the tile. After the resin is hardened the dies are opened and the tile removed.

Although the tile can be used as it is molded, it is preferable to grind one of its faces 14 to produce a plane surface. Such grinding is especially desirable so that the chips 11 are exposed to form a tile of a true terrazzo appearance. After the grinding step, the tile is coated with a luster enhancing film of floor polishing wax, or a polyethylene sealer as used on ordinary vinyl or rubber floor tile or an epoxy resin floor dressing. This type of coating not only improves the appearance of the tile but also prevents dirt and grime from being worked into the surface of the tile to mar its appearance.

MIXING

Inasmuch as the thermosetting resin from which these tiles are made is viscous, the tile-forming mixtures are plastic or doughy so that a rather difficult mixing task is presented. Generally, the mixing is achieved through a stretching, a folding, a kneading or a tearing action, or the most desirable combination of these actions. However the ingredients are mixed, the mixing is sufficiently thorough that all surfaces of the solid particles are thoroughly wetted by the non-solid materials and the particles are uniformly distributed throughout the mass.

It has been found that mixers of types commonly used in bakeries for mixing dough are satisfactory to mix the ingredients of the tile. When mixers of such type are used, the resin, pigment, and catalyst preferably are mixed first, then the chips are added, if of several size ranges, from coarse to fine in that order, and finally the filler. Should the temperature rise at rapid mixing rates to create danger of premature thermosetting of the resin, some means of cooling the mixture should be provided.

Where other types of mixers are used, the order of mixing of the ingredients may be changed.

The dies are heated, generally by steam, to a temperature between 150° F. and 350° F. A lump of the mixture is placed between the dies and the dies are closed so that the mass is substantially uniformly spread therebetween until such mass completely fills the available space between the dies. At such time some of the resin is forced into the clearance 26 about the dies and due to its plastic nature, forms a seal therebetween so that the mass of mixture is henceforth totally confined. The dies continue to close, compressing the mass now totally enclosed until the ultimate closed position is reached. The force closing the dies can be any pressure desired from a minimum of 150 p.s.i. to 1200 p.s.i. and preferably is 325 to 460 p.s.i. Thus, at least ten tons of pressure should be applied to the dies by piston 21, and more than twenty tons is prefered, when a tile is molded having approximately one square foot of surface 14.

With the composition as described above and at such pressures, the mass flows uniformly and is displaced and compacted in the die formed cavity without crushing stone particles or any tendency of the larger particles to cluster or bunch together in the molding step. The pressure applied on the mass after it is confined between the dies forces occluded air and other fluids in such mass into uniform dispersion or solution throughout such mass and no air pockets or voids are formed in the resultant tile.

With 450–460 p.s.i. applied by the dies on the tile mass and the temperature of the dies at 300° F., the molding cycle is not more than one minute duration and the time during which the dies are completely closed until opened is not more than forty seconds. The tile of Example III is prepared by such molding cycle.

Although molding can be accomplished with a temperature of 150° F. and a pressure of 450–460 p.s.i. on the tile mass, the molding cycle will be lengthened somewhat. The thermosetting action is exothermic and usually will start at about 150° F., and thus the internal temperature increase assists in reaching the thermosetting temperature.

Temperatures of the dies should not substantially exceed 400° F., to prevent the resin from thermosetting before the tile-forming mixture is uniformly distributed in the cavity between the dies.

When the tile mixture in the dies is cured, the dies are separated and the formed tile is removed while it is hot. The tiles may then be placed in stacks to utilize their heat content to provide an additional curing period while cooling in air. This insures that the maximum strength due to complete polymerization of the resin in the mixture is obtained.

The tile, as it comes from the molding dies, is covered with a film of mold release agent which should be removed.

If a conventional terrazzo appearance is not desired upon removal of the mold release agent, the tiles are ready for use, but the surface of the tile is not mirror smooth.

However, it is often desirable to grind one of the faces 14 of the tile 10 to expose and polish the imbedded stone chips 11. After such griding, the tile is coated with a polishing agent such as floor wax and there is achieved the most desirable appearance of the conventional terrazzo material. Further, because of the variety of pigments that can be added, and the natural coloring of the chips and filler, any color tile can be produced. As previously stated, one of the tiles made without chips has the appearance of marble itself and for all purposes can be substituted for a marble covering if desired.

The tiles can be utilized in most conventional ways, such as by securing them into place by an adhesive. The matrix 13 of the tile, comprising of resin and filler, has nearly the same hardness of the chips, and, therefore, differential wearing of the matrix and chips is greatly reduced. The tiles provide the same desirable properties as the conventional terrazzo flooring, and others in addition. Such additional advantages are simple and economical to manufacture, inexpensive installation by regular floor and tile setting craftsmen compared to the cost of the terrazzo floor workers and should some area of the tile surface be damaged, it is easily replaceable.

The following examples illustrate typical formulae useful in practicing the present invention and results obtained thereby.

EXAMPLE I

A tile formula having the following composition was prepared and tiles were formed by placing weighed masses of the composition in a heated mold and applying pressure upon the mass.

|  | Cu. In. | Vol. Percent | Wt. Percent | Wt. |
|---|---|---|---|---|
| Polyester Polymer | 31.1 | 9.6 |  | 22 oz. |
| Vinyl Toluene | 16.0 | 4.98 |  | 10 oz. |
| Total Liquid Resin |  | 14.58 | 7.2 |  |
| Catalyst | 0.23 |  |  | 0.16 oz. |
| Mold Release Agent | 0.46 |  |  | 0.32 oz. |
| Silica (30 to 50 mesh) | 166.7 |  |  | 15.0 lbs. |
| Marble (crushed to pass a 40 mesh screen). | 66.6 |  |  | 6.0 lbs. |
| BaSO₄ (100 mesh) | 30.7 |  |  | 4.0 lbs. |
| Clay (10 microns to 1 micron) | 9.6 |  | 1.81 | 0.5 lb. |
| Total Stone |  | 85.42 | 92.7 |  |

The crushed marble contained all material passing a 40 mesh screen and included some material as fine or finer than 200 mesh size but the amount of such fine material was small. It was estimated that the quantity of marble of 40 to 60 mesh size was roughly approximate that required to fill residual voids left by the 30 to 50 mesh silica if the latter were dispersed in a volume such that the silica particles were substantially in contact with each other; that the fine marble and barium sulfate provided sufficient 100 mesh material to occupy a volume roughly approximating residual voids that would be left by the coarser marble particles; that the clay and particles of very fine material included in the above ingredients were present in quantity roughly approximating that which would be required to fill residual voids left by the 100 mesh material. The resin was found to be sufficient to coat all surfaces of the stone particles and to fill any residual voids in the tile.

It was found that the stone particles, including the coarser silica of 30 to 50 mesh size and the coarser marble particles, flowed evenly with the resin as pressure was applied to the mold and there was no tendency for resin to be squeezed out of a mass of stone particles left behind as pressure was applied.

Tiles of excellent appearance were produced. These tiles however, were a little too stiff to be applied satisfactory to surfaces having substantial irregularities or deviating very much from planar configuration. This composition illustrates that of a tile having flexibility approaching the minimum practical for application to building elements which have normal irregularities.

EXAMPLE II

A mixture having the formula set forth in the following table below was prepared and tiles made from the mixture were cured as described above. Properties of the tile were determined.

|  | Wt. Percent | Weight |
|---|---|---|
| Polyester Polymer | 5.29 | 16.0 oz. |
| Monomer | 4.19 | 12.0 oz. |
| Total Resin | 9.48 | 28.0 oz. |
| Benzoyl Peroxide Catalyst | 0.21 | 0.6 oz. |
| Zinc Stearate Mold Release | 0.21 | 0.6 oz. |
| TiO₂ | 0.35 | 1.0 oz. |
| Silica 14–30 mesh | 39.14 | 7.0 lbs. |
| Silica 30–50 mesh | 11.18 | 2.0 lbs. |
| Marble, crushed to pass a 40 mesh screen | 22.37 | 4.0 lbs. |
| Silica 200 mesh | 11.18 | 2.0 lbs. |
| Clay, average size about 4.5 microns | 5.54 | 1.0 lb. |

Uniform flow of the 14–50 mesh particles was obtained. The tiles were of excellent quality, and substantially no shrinkage resulted. The tile had sufficient flexibility, due to larger resin content than the tile of Example I, to be applied to surfaces having substantial irregularities.

EXAMPLE III

This is a tile manufactured from a maleic anhydride polyester resin having 23% styrene by weight, sold under the designation No. 5140 by the Pittsburgh Paint Company. The tile had a marble-like appearance due to the natural coloring of the marble fines. *No chips were used.*

| Constituent | Percentage (Wt.) | Parts (Wt.) |
|---|---|---|
| (a) Resin | 15.3 | 1.0 |
| (b) A catalyst in the form of a paste having 50% by weight of benzoyl peroxide | .1 | 0.1 |
| (c) Zinc stearate | 1.0 |  |
| (d) Filler comprised of stone particles including marble fines with particles ranging from 60 mesh to dust | 83.6 | 5.5 |
|  | 100 | 6.6 |

A good quality tile was produced. Although the size distribution of the marble was not determined a relatively large proportion of fine material was present. Substantially uniform distribution of the larger marble particles in the tile was obtained.

EXAMPLE IV

This tile was manufactured from a maleic anhydride, isophthalic acid and phthalic anhydride resin with 30% vinyl toluene by weight, sold under the designation of "Polylite 8181" by Reichhold Chemicals, Inc. This tile contained stone chips so that a true terrazzo appearance was produced.

| Constituent | Percentage (Wt.) | Parts (Wt.) |
|---|---|---|
| (a) Resin | 14.2 | 1.0 |
| (b) A catalyst in the form of a paste having 50% by weight of benzoyl peroxide | .1 | .3 |
| (c) Zinc stearate | .4 |  |
| (d) Titanium dioxide pigment | 4.0 |  |
| (e) Filler consisting of stone particles having a particle size ranging from 60 mesh to dust | 33.8 | 2.4 |
| (f) Chips | 47.5 | 3.3 |
|  | 100 | 7.0 |

The filler was used in amount equivalent to about 71 weight percent of the chips. This ratio of filler to chips was the about minimum ratio that could be used to obtain uniform flow of chips, filler and resin with this particular thermosetting resin.

EXAMPLE V

This tile was manufactured from a phthalic anhydride, isophthalic acid and maleic anhydride polyester resin with 30% vinyl toluene monomer, sold under the designation of "Polylite 8181" by Reichhold Chemicals, Inc. The tile had a pure white matrix formed in the terrazzo due to the addition of a white pigment, titanium dioxide. The quality of the tile was excellent.

| Constituent | Percentage (Wt.) | Parts (Wt.) |
|---|---|---|
| (a) Resin | 15.9 | 1.0 |
| (b) A catalyst in the form of a paste having 50% by weight of benzoyl peroxide | .2 | .3 |
| (c) Zinx stearate | 1.0 |  |
| (d) Titanium dioxide pigment | 4.0 |  |
| (e) Filler comprised of stone particles having a particle size ranging from 60 mesh to dust | 60.0 | 3.8 |
| (f) Chips comprised of crushed stone having particles larger than the filler and having one dimension at least as small as the minimum dimension of the tile | 19.0 | 1.2 |
|  | 100 | 6.3 |

The large ratio of filler to chips was believed to indicate that the maximum ratio of filler to chips is indefinite and immaterial. Good uniform flow of chips with filler and resin in the dies was obtained.

EXAMPLE VI

This title is manufactured from a phthalic anhydride and maleic anhydride polyester resin with 50% styrene by weight as the monomer. The resin of Example V was used with sufficient added monomer to give a monomer content of 50%. This tile has a blue color due to the use of iron oxide pigments, and was of good uniform quality.

| Constituent | Percentage (Wt.) | Parts (Wt.) |
|---|---|---|
| (a) Resin | 14.5 | 1.0 |
| (b) A catalyst in the form of a paste having 50% by weight of benzoyl peroxide | .1 | |
| (c) Zinc stearate | 1.0 | .1 |
| (d) Iron oxide pigment | .4 | |
| (e) Filler comprised of stone particles having a particle size ranging from 60 mesh to dust | 50.5 | 3.5 |
| (f) Chips comprised of crushed stone having particles larger than the filler and having one dimension at least as small as the minimum dimension of the tile | 33.5 | 2.3 |
| | 100 | 6.9 |

EXAMPLE VII

This tile is manufactured from a Retzloff Chemical Company resin, a diallyl phthalate resin but using a resin produced by reactions of allyl alcohol and phthallic anhydride and with 30% styrene by weight.

| Constituent | Percentage (Wt.) | Parts (Wt.) |
|---|---|---|
| (a) Resin | 14.4 | 1.0 |
| (b) A catalyst in the form of a paste having 50% by weight of benzoyl peroxide | .1 | |
| (c) Zinc stearate | 1.0 | .1 |
| (d) Filler comprising stone particles having a particle size ranging from 60 mesh to dust, including "Texas Amber Marble" to a particle size 60 mesh to dust | 46.7 | 3.2 |

This tile has the color of marble, with variegated appearance so like actual marble as to be practically indistinguishable. The amount of resin used can be reduced so that a lower ratio of resin to stone particles is obtained. Such reduced ratio is as follows in parts by weight: resin 1.0, filler 4.3, chips 3.5, benzoyl peroxide catalyst and zinc stearate as mold release agent 0.1 for a total of 8.9 parts.

From the foregoing it will be seen that this invention is one well adapted to attain all of the ends and objects hereinabove set forth, together with other advantages which are inherent to the structure and its method and manufacture.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In a process for manufacturing tile wherein a thermosetting resin including a polymer and a monomer reactive therewith to form a thermoset plastic is intimately mixed with stone particles, a lump of the resulting mixture is placed in a mold, sufficient pressure is applied to the mold to cause the lump to spread to fill the mold, and the spread mixture is cured under heat and pressure that improvement which comprises employing in said process an intimate mixture of from about 7 to about 25 weight percent of thermosetting resin with about 93 to 75 weight percent of stone particles, said stone particles including particles above 100 mesh in size which do not normally spread uniformly with the thermosetting plastic in said mold and a sufficient quantity of particles of smaller size to spread the particles of size above 100 mesh uniformly with flow of said resin in the mold.

2. The process of claim 1 wherein the thermosetting resin in the mixture is in the range from about 10 to 12 weight percent and the stone particles are in the range from 90 to 88 weight percent.

3. The process of claim 1 wherein the stone particles have sizes in a series of progressively smaller size ranges, the particles in each smaller size range being present in proportions of about 30 to 45 weight percent of particles in the next larger size range.

4. The process of claim 3 wherein the stone particles further include about 8 to 10 percent clay.

5. The process of claim 1, wherein the thermosetting resin is a polyester resin; the resin is mixed with about 5.7 to 7.8 parts by weight of stone particles per part of resin, the stone particles including about 2.4 to 4.5 parts of filler and about 2.3 to 5.4 parts of chips.

6. The process of claim 3 wherein the size ranges are, respectively, above 1/16 inch; 30 to 50 mesh; 40 mesh to 100 mesh; and below 200 mesh.

7. The process of claim 3 wherein the size ranges are, respectively, 14 to 30 mesh; 30 to 50 mesh; and from 200 mesh to 1 micron.

8. The process of claim 1, wherein a small amount of pigment is imperfectly mixed in the resin-stone mixture.

References Cited by the Examiner

UNITED STATES PATENTS 2,995,179  8/1961  Scolamiero _____ 264—245
3,027,290  3/1962  Valore _____ 156—245

ALEXANDER H. BRODMERKEL, Primary Examiner.

B. SNYDER, Assistant Examiner.